3,282,964
NEW α-SUBSTITUTED CARBOXYLIC ACID
DERIVATIVES
Etienne Szarvasi, Lyon, and Liliane Neuvy, Paris, France,
assignors to Lipha, Lyonnaise Industrielle, Pharmaceutique
No Drawing. Original application Feb. 21, 1962, Ser. No. 174,684, now Patent No. 3,257,420, dated June 21, 1966. Divided and this application Sept. 3, 1965, Ser. No. 485,085
Claims priority, application France, Feb. 23, 1961, 853,642
10 Claims. (Cl. 260—346.1)

This invention relates to α-substituted carboxylic acid derivatives and their production.

This application is a divisional application of application Serial 174,684, filed February 21, 1962, now Patent No. 3,257,420.

The compounds with which the invention is concerned are the α-substituted carboxylic acid nitriles and amides represented by the general formula $$R_2(CH_2)_n\text{—}CH\text{—}R$$

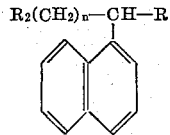

I wherein $n$ is an odd number at most equal to 3,
R is a member of the group consisting of the CN and $CONH_2$ radicals, and
$R_2$ is a member of the group consisting of the furyl and tetrahydrofuryl radicals—when $n$ denotes the number 1—the vinyl and 1-propenyl radicals.

When R in general Formula I is CN, the compounds of the invention have the general formula:

$$R_2(CH_2)_n\text{—}CH\text{—}CN$$

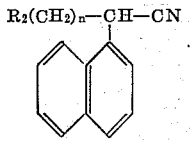

II

The nitriles of Formula II may be prepared by reacting 1-naphthyl acetonitrile or a nitrile of the general formula $$R_2(CH_2)_n\text{—}CH_2\text{—}CN \qquad (III)$$

wherein $n$ and $R_2$ have the same meanings as in Formula I, with sodamide, so as to form the alkali metal derivative of 1-naphthyl acetonitrile and the nitrile of Formula III and condensing said derivative with a halonaphthyl or a halide of the general formula $$R_2(CH_2)_n\text{—}X$$

respectively wherein $R_2$, and $n$ have the same meanings as in Formula I and X is halogen, the condensation preferably being effected in a solvent such as ether.

When R in Formula I is $CONH_2$, the compounds of the invention have the general formula $$R_2(CH_2)_n\text{—}CH\text{—}CONH_2$$

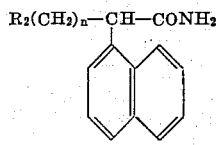

IV

The amides of Formula IV may be prepared by hydrolysing the corresponding nitrile of Formula II with a substantially equimolecular quantity of an alkali metal hydroxide, for example potassium hydroxide, in the presence of an alcohol, for example ethanol.

The nitriles of Formula II and the amides of Formula IV are of use as intermediates in the preparation of the α-substituted carboxylic acids and esters described and claimed in copending application Serial 174,684, filed February 21, 1962, now Patent No. 3,257,420.

The following examples illustrate the invention.

EXAMPLE 1.—Preparation of α-(1-naphthyl) β-furylpropionitrile $C_{17}H_{13}ON$ (M=247.27)

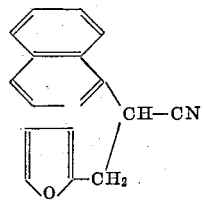

Into a well-dried spherical flask are introduced 580 cc. of dry ether, 57 g. of 90% sodamide (1.26 mol. of $NaNH_2$) and 196 g. (1.17 mol.) of α-1-napthhylacetonitrile, whereafter the mixture is heated under reflux for one hour. The flask is cooled in an ice bath and there are added drop-by-drop 157 g. (1.34 mol.) of furfuryl chloride dissolved in 157 cc. of dry ether. After heating under reflux for 6 hours, the product is carefully poured into water and acidulated with hydrochloric acid. On distillation, there are obtained 208 g. of pale yellow viscous liquid distilling at 193–196° C./3 mm. Hg. Yield 71.8% (theoretical quantity 289.2 g.). After redistillation, the product has the following constants:

B.P.=194–195° C./2 mm. Hg
Refractive index: $n_d^{22}$=1.611

It crytallises at ambient temperature.

After two recrystallisations from a mixture of ethanol and hexane in equal volumes, there is obtained a white solid having a melting point of 46.5–48° C. (on the heating-stage microscope).

Gravimetric analysis gives.—Calculated: C, 82.58%; H, 5.29%; N, 5.66%. Found: C, 82.21%; C, 82.99%; N, 5.45%; H, 5.33%; H, 5.33%; N, 5.27%.

EXAMPLE 2.—Preparation of α-(1-naphthyl) β-tetrahydrofurylpropionitrile $C_{17}H_{17}ON$ (M=251.31)

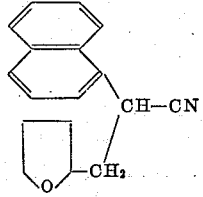

41.2 g. (0.25 mol) of tetrahydrofurfurylbromide are condensed with 37.5 g. (0.224 mol.) of α-(1-naphthyl)-acetonitrile by the same procedure as in Example 1.

After distillation, there are obtained 37.5 g. of pale yellow viscous liquid distilling at 184–187° C./1 mm. Hg. Yield 67% (theoretical quantity 56.4 g.). After redistillation, the product has a boiling point of 154° C./0.4 mm. Hg.

Gravimetric analysis.—Calculated: C, 81.29%; H, 6.82%; N, 5.57%. Found: C, 81.01%; C, 81.14%; H, 6.63%; H, 6.79%; N, 6.05%; N, 6.10%.

EXAMPLE 3.—*Preparation of α-(1-naphthyl-δ-tetrahydrofuryl valeronitrile*

$C_{19}H_{21}ON$  (M=279.36)

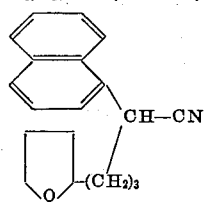

62.2 g. (0.373 mol.) of 1-naphthylacetonitrile are condensed with 18.5 g. of 90% sodamide (0.425 mol. of $NaNH_2$) in 185 cc. of dry ether by the procedure of Example 2. There are added drop-by-drop 80 g. (0.439 mol.) of tetrahydrofurylpropylbromide in 80 cc. of dry ether. After distillation, there are obtained 73.3 g. of slightly turbid, very viscous, yellow liquid distilling at 192–194° C./0.5 mm. Hg. Yield 60%. The redistilled product has the following constants:

B.P./0.4 mm. Hg=183° C.

Gravimetric analysis.—Calculated: C, 81.70%; H, 7.57%; N, 5.01%. Found: C, 81.83%; H, 7.72%; N, 5.14%.

EXAMPLE 4.—*Preparation of α-(1-napththyl-Δ⁴ hexenoic nitrile*

$C_{16}H_{15}N$  (M=221.28)

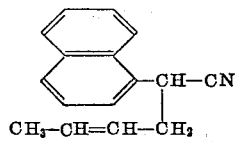

11.1 g. of 90% sodamide (0.238 mol. of $NaNH_2$) in 110 cc. of dry ether are reacted as in Example 1 with 37.5 g. (0.224 mol.) of napththylacetonitrile and 33 g. (0.244 mol.) of crotyl bromide. There are obtained 32.5 g. of viscous yellow liquid. Yield 65.7% (theoretical quantity 49.5 g.). After two redistillations, the product has the following constants:

B.P./0.9 mm. Hg=138° C.

Gravimetric analysis.—Calculated C, 86.88%; H, 6.83%; N, 6.33%. Found: C, 86.52%; 6.97%; N, 6.69%.

Sodium methylate may be employed as condensing agent instead of sodamide.

EXAMPLE 5.—*Preparation of α-(1-napththyl)-Δ₄ pentenoic nitrile*

$C_{15}H_{13}N$  (M=207.25)

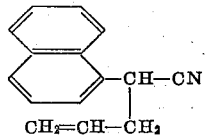

11.1 g. of 90% sodamide (0.238 mol. of $NaNH_2$) in 110 cc. of dry ether are reacted as in Example 1 with 37.5 g. (0.224 mol.) of 1-naphthylacetonitrile and 28 g. (0.223 mol.) of allyl bromide.

The addition of allyl bromide takes place in an ice bath, and the reaction is violent.

Distillation of the final product gives 39.5 g. of pale yellow liquid distilling at 160° C./1.5 mm. Yield 85.6%. The redistilled product (which can also be referred to as α-allyl-1-naphthylacetonitrile) has the following constants:

B.P./0.4 mm.—130° C.
B.P./0.5 mm.—132° C.
Density: $D_4^{21}$—1.0520
Refractive index: $n_D^{19.5}$=1.603

Gravimetric analysis.—Calculated: C, 86.94%; H, 6.31%; N, 6.76%. Found; C, 86.94%; C, 86.87%; H, 6.29%; H, 6.15%; N, 7.11%; N, 7.04%.

Example 6.—*Preparation of α-(1-naphthyl) β-furyl-propionamide*

$C_{17}H_{15}NO_2$  (M=265.29)

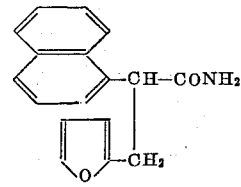

4.4 g. (0.079 mol.) of caustic potash in 5 cc. of water and 120 cc. of ethyl alcohol are heated under reflux for 50 hours with 19.5 g. (0.79 mol.) of α-(1-naphthyl) β-furyl-acetonitrile. When the reaction is complete, the ethanol is evaporated in vacuo. The cooled mixture is acidulated with hydrochloric acid. The oily product is extracted with ether. After evaporation of the ether, there remains a solid residue, which is recrystallised from ethanol. There are obtained as the first fraction 2 g. of slightly yellow crystals, and then as the second fraction 1.5 g. of slightly brown crystals (total yield 50.2%). After two further recrystallisations, the product takes the form of white crystals having a melting point of 107–108° C. (heating-stage microscope).

Gravimetric analysis.—Calculated: C, 77.00%; H, 5.70%; N, 5.28%. Found: C, 77.26%; C, 77.11%; H, 5.85%; H, 5.74%; N, 5.37%; N, 5.43%.

Example 7.—*Preparation of α-(1-naphthyl) β-tetrahydrofuryl-propionamide*

$C_{17}H_{19}NO_2$  (N=269.32)

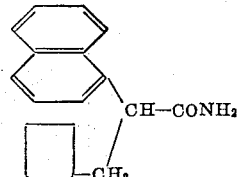

15.5 g. (0.0617 mol.) of α-(1-naphthyl) β-tetrahydrofuryl-propionitrile are hydrolysed in the manner described in Example 6. After the treatment and evaporation of the extraction solvent (benzene), there remain 12.5 g. (yield 75%) of a crystalline mass.

After two recrystallisations from ethyl acetate, the product has the following constants:

M.P.=153–153.5° C.

Gravimetric analysis.—Calculated: C, 75.83%; H, 7.11%; N, 5.20%. Found: C, 75.62%; H, 7.14%; N, 5.14%.

Example 8.—*Preparation of α-(1-naphthyl) Δ⁴-hexenoic amide*

$C_{15}H_{17}NO$  (M=239.30)

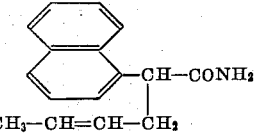

22 g. (0.1 mol.) of α-(1-naphthyl)-Δ⁴-hexenoic nitrile are hydrolysed by the procedure described in Example 6. There are obtained 21 g. of yellow product (yield 87.7%). After four recrystallisations from ethyl acetate, the product has a melting point of 121–122° C. It sublimates in the neighbourhood of this temperature.

Gravimetric analysis.—Calculated: C, 80.30%; H, 7.16%; N, 5.85%. Found: C, 80.43%; H, 7.30%; N, 6.03%.

What we claim is:

1. An α-substituted carboxylic acid derivative represented by the general formula

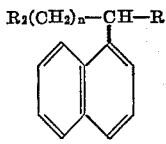

wherein
$n$ is an odd number at most equal to 3,
R is a member of the group consisting of the CN and $CONH_2$ radicals, and
$R_2$ is a member of the group consisting of the furyl and tetrahydrofuryl radicals—when $n$ denotes the number 1—the vinyl and 1-propenyl radicals.

2. α-(1-naphthyl)-β-furylpropionitrile.
3. α-(1-naphthyl)-β-tetrahydrofurylpropionitrile.
4. α-(1-naphthyl)-δ-tetrahydrofurylvaleronitrile.
5. α-(1-naphthyl)-Δ⁴-hexenoic nitrile.
6. α-(1-naphthyl)-Δ⁴-pentenoic nitrile.
7. α-(1-naphthyl)-β-furyl-propionamide.
8. α-(1-naphthyl)-β-tetrahydrofuryl-propionamide.
9. α-(1-naphthyl)-Δ⁴-hexenoic amide.
10. Process for the production of an α-substituted carboxylic acid derivative represented by the general formula

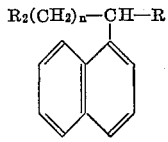

wherein
$n$ is an odd number at most equal to 3,
R is a member of the group consisting of the CN and $CONH_2$ radicals, and
$R_2$ is a member of the group consisting of the furyl and tetrahydrofuryl radicals—when $n$ denotes the number 1—the vinyl and 1-propenyl radicals, which comprises condensing under reflux, for about one hour the 1-naphthyl acetonitrile with a member of the group consisting of a halonaphthyl and a halide of the formula $R_2(CH_2)_n$—X,
wherein $n$ and $R_2$ have the same meanings as in claim 1 and X is a halogen, then heating under reflux about some hours, to form the desired nitrile and hydrolysing under reflux the said nitrile, for about 50 hours, with a substantially equimolecular quantity of an alkali in the presence of a lower alkyl alcohol.

References Cited by the Examiner

Chemical Abstracts, vol. 58, page 1435 (1963).

NICHOLAS S. RIZZO, *Primary Examiner.*